United States Patent Office.

JOHN W. HYATT, OF NEWARK, NEW JERSEY, ASSIGNOR TO THE NEWARK FILTERING COMPANY, OF SAME PLACE.

COAGULANT FOR PURIFYING WATER.

SPECIFICATION forming part of Letters Patent No. 350,680, dated October 12 1886.

Application filed February 26, 1885. Renewed September 3 1886. Serial No. 212,632. (No specimens.)

*To all whom it may concern:*

Be it known that I, JOHN W. HYATT, a citizen of the United States, and a resident of Newark, in the county of Essex and State of New Jersey, have invented certain new and useful Improvements in the Manufacture of Coagulants, of which the following is a specification.

The invention relates to improvements in preparing coagulants used in the art of filtration for the purpose of effecting a coagulation of the impurities in water with a view to their arrest by means of a filter-bed, and is intended especially to be practiced in connection with the process described and claimed in Letters Patent of the United States No. 293,740, granted to Isaiah Smith Hyatt, February 19, 1884, for method of purifying water.

The distinctive novelty of the invention consists in the utilization of a solidified cylinder or body of material adapted to the proper coagulation of the particles contained in the water to be treated, and in so forming, arranging, or placing the solidified coagulant that only a definite quantity of it may be removed and enter the receptacle containing the filtering agent with the inflowing stream.

The solidified cylinder or body of coagulant may be employed in any convenient way, according to circumstances, and may be of any appropriate materials. I have described hereinafter, however, the preferred ingredients and the apparatus which I prefer to make use of.

The elements entering into the composition of the coagulant which I prefer to use are rosin and alum, in the proportion of about ten parts of alum, to one of rosin. These ingredients are melted and thoroughly mixed and molded or shaped in any suitable form, preferably in the form of a rod or cylinder. The function of the rosin is to preserve the configuration of the rod and prevent the too rapid dissolution of the alum, which is the ingredient relied upon to effect the desired coagulation. Other materials may be substituted for rosin—such, for instance, as mineral pitch—to accomplish the proper preservation of the shape of the compound.

An illustration of a coagulating agent which I may employ instead of alum, as hereinbefore recited, is a compound consisting of alum and perchloride or persulphate of iron, in preparing which I prefer to use, say, five pounds of alum to about one pound of perchloride or persulphate of iron. The two will be melted together and molded into the desired shape. I mention this last compound as an illustration. Many others will suggest themselves to persons having a knowledge of the art to which the invention relates.

After the coagulating agent has been made to assume the desired form or shape, it may be coated or protected by means of paraffine or other suitable water-proof varnish, some part of the surface being permitted to remain uncoated or unprotected, so as to permit of the removal of the necessary quantity of the coagulating agent. I have found it desirable to make the material into a rod or cylinder, leaving one end uncoated or exposed, which is, perhaps, the most convenient method; but the same results will be produced even if no coating be used, provided the solidified body is so protected or inclosed as to insure the removal of the coagulating agent. By coating the body and leaving the lower end only exposed, as above described, it will be observed that the amount of surface exposed to the action of the water will never vary, which would be the case were the outer coating omitted, for, as the water acting on the whole surface of the body would gradually dissolve the latter, the surface thereof would be decreased to the same degree.

I have shown and described in an application heretofore filed by me, and bearing Serial No. 129,341, an apparatus by means of which a rod or body of solidified coagulating material can be successfully used. This apparatus consists of a receptacle of appropriate size and shape, in which the rod of coagulating material may be placed. The bottom of the receptacle is perforated, and in that way connected with the inflowing stream. As the water enters the filter the necessary disintegration of the lower portion of the rod of solidified coagulating material is accomplished. The quantity of water operating upon the rod and of the coagulating material thus taken up by the inflowing stream is regulated by a valve or otherwise. This apparatus is a desirable one; but, as will be readily understood, the solidified coagulating material may be employed in other ways to accomplish the desired object.

In the foregoing specification I have mentioned compounds having exceptionally desirable characteristics; but it is obvious that the ingredients may be varied according to the kind of water to be treated and other circumstances.

The coagulants which I have described contemplate especially the utilization of a compound in which the configuration of the rod or body is accomplished by using the coagulant proper in combination with a less soluble material. It is manifest that a great variety of compounds may be produced, and that any appropriate materials may be employed in connection with each other. It is also obvious that the solidified coagulant may be utilized in other ways than I have described. I have pointed out what I conceive to be a very convenient way of using it; but I do not limit myself to its employment in any particular way. Thus it may be placed inside of the receptacle containing the filtering material, and arranged to be acted upon by the water after it has entered the receptacle. Numerous other ways of using it might be mentioned.

What I claim as my invention, and desire to secure by Letters Patent, is—

As an article of manufacture for use in processes of clarifying water, a solidified body of coagulant, consisting, essentially, of alum and a less soluble material, as rosin, said body, excepting one end thereof, which is left fully exposed, being coated on its outer surface with a water-proof covering, the extent of the exposed surface which is to be acted on by the inflowing stream thereby always remaining the same until the body is disintegrated, substantially as set forth.

Signed this 24th day of February, A. D. 1885.

JOHN W. HYATT.

Witnesses:
CHAS. C. GILL,
HERMAN GUSTOW.